United States Patent
Nakamura et al.

(10) Patent No.: US 9,223,585 B2
(45) Date of Patent: Dec. 29, 2015

(54) DATA PROCESSING DEVICE WITH SERIAL BUS THAT NEEDS INITIALIZATION BEFORE USE

(71) Applicant: FANUC CORPORATION, Yamanashi (JP)

(72) Inventors: Minoru Nakamura, Yamanashi (JP); Takashi Miyoshi, Yamanashi (JP)

(73) Assignee: FANUC CORPORATION, Yamanshi (JP)

( * ) Notice: Subject to any disclaimer, the term of this patent is extended or adjusted under 35 U.S.C. 154(b) by 143 days.

(21) Appl. No.: 14/168,955

(22) Filed: Jan. 30, 2014

(65) Prior Publication Data

US 2014/0215200 A1   Jul. 31, 2014

(30) Foreign Application Priority Data

Jan. 31, 2013   (JP) .................................. 2013-016901

(51) Int. Cl.
*G06F 9/00* (2006.01)
*G06F 9/44* (2006.01)

(52) U.S. Cl.
CPC .................... *G06F 9/4411* (2013.01)

(58) Field of Classification Search
None
See application file for complete search history.

(56) References Cited

U.S. PATENT DOCUMENTS

| | | | |
|---|---|---|---|
| 5,938,742 A * | 8/1999 | Faddell et al. | 710/9 |
| 6,535,974 B1 * | 3/2003 | Chang et al. | 713/1 |
| 2007/0233995 A1 | 10/2007 | Yamazaki et al. | |
| 2010/0017587 A1 | 1/2010 | Wiginton et al. | |
| 2011/0058573 A1 | 3/2011 | Balakavi et al. | |

FOREIGN PATENT DOCUMENTS

| | | | |
|---|---|---|---|
| JP | 2002-140205 A | 5/2002 |
| JP | 2003-114800 A | 4/2003 |
| JP | 2007233534 A | 9/2007 |
| JP | 2012216108 A | 11/2012 |
| JP | 201320500 A | 1/2013 |

OTHER PUBLICATIONS

Office Action mailed May 13, 2014, corresponds to Japanese patent application No. 2013-016901.

* cited by examiner

*Primary Examiner* — Kim Huynh
*Assistant Examiner* — Paul J Yen
(74) *Attorney, Agent, or Firm* — Hauptman Ham, LLP

(57) ABSTRACT

A data processing device 1 comprises: first processors (2-i (i=1, 2, . . . , n)) that initialize the data processing device based on boot programs; a chip set (4) that includes first memories (4a-j (j=1, 2, . . . , m)) that store the first boot program (Pj (j=1, 2, . . . , m)) respectively and a memory controller (4b) that reads out the first boot program (Pj (j=1, 2, . . . , m)); second buses (5-i (i=1, 2, . . . , n)) that are arranged between the memory controller (4b) and the first processors (2-i (i=1, 2, . . . , n)) respectively, and do not require initialization based on boot programs before use; and first buses (3-i (i=1, 2, . . . , n)) that are connected with the first processors (2-i (i=1, 2, . . . , n)) and require initialization based on boot programs before use.

9 Claims, 7 Drawing Sheets

DATA PROCESSING DEVICE WITH SERIAL BUS THAT NEEDS INITIALIZATION BEFORE USE

This application is a new U.S. patent application that claims benefit of JP 2013-016901, filed on Jan. 31, 2013, the content of JP 2013-016901 is incorporated herein by reference.

FIELD OF THE INVENTION

The present invention relates to a data processing device that comprises a serial bus that requires initialization before use.

BACKGROUND OF THE INVENTION

A data processing device, typically represented by Computer Numerical Control apparatus (CNC) and robot controllers, comprises one or more processors, a chip set that realizes a predetermined function in collaboration with the processors, a bus that communicates data between the processors and the chip set, and a boot Read Only Memory (ROM) that stores a boot program for initializing the data processing device after powering thereon, and the like. Conventionally, a parallel bus is used as a bus for such a data processing device (for example, Patent Literature 1 and Patent Literature 2).

Patent Literature 1: JP-A-2002-140205
Patent Literature 2: JP-A-2003-114800

In recent years, a serial bus, such as Peripheral Component Interconnect (PCI) Express, tends to be used as a bus of a data processing device, instead of a parallel bus, in order to communicate data between the processor and the chip set with a higher speed. There are serial buses, such as a PCI Express that use the processor as a root complex, that is not allowed to be initialized from the chip set side before use. Such serial buses are required to be initialized by the processor based on a boot program before use. In such a case, the processor is difficult to acquire a boot program through the serial bus. Therefore, in order for the processor to initialize the data processing device after powering, the processor needs to be connected to an external boot ROM using a boot bus that does not require initialization based on a boot program before use.

When a data processing device uses a serial bus that requires initialization based on a boot program before use, in order to initialize the serial bus, the number of boot ROMs needs to be increased in accordance with the increase in the number of the processors equipped on the data processing device. This results in the mounting area of the boot ROMs having to be expanded and costs are increased.

The objective of the present invention is to provide a data processing device that can initialize a serial bus without increasing the number of boot ROMs in accordance with the increase in the number of the processors, even when the serial bus requires initialization based on a boot program before use.

SUMMARY OF THE INVENTION

The data processing device according to the present invention comprises: a first number of first processors that initialize the data processing device based on boot programs for initialization after power-on, the first number being one or more; first buses, connected with the first processors, that require initialization based on boot programs before use; a chip set that includes: a second number of first memories that store first boot programs, the second number being one or more and being the first number or less; and a memory controller that reads out the first boot programs stored in the first memories; and the first number of second buses, arranged between the memory controller and the first processors to provide the first boot programs read out by the memory controller to the first processors, that do not require initialization based on boot programs before use.

Preferably, the chip set further includes a boot control unit that performs at least one of: controlling activation timing of the first processors; controlling reboot timing of the first processors; and controlling access to the second buses.

Preferably, the data processing device according to the present invention further comprises: a nonvolatile second memory that stores a second boot program for initialization after power-on; and a third bus, arranged between the second memory and at least one of the first processors to provide the second boot program stored in the second memory to the first processor, that does not require initialization before use based on a boot program by the first processor, wherein the boot control unit selects either one of the first boot programs stored in the first memories or the second boot program stored in the second memory so that the first processor executes either one of the first boot programs or the second boot program upon activation.

Preferably, the data processing device according to the present invention further comprises: a nonvolatile second memory that stores a second boot program for initialization after power-on, wherein at least one of the second buses includes: a first portion that is arranged between the memory controller and one of the first processors to provide one of the first boot programs read out by the memory controller to the first processor; and a second portion that is arranged between the first portion and the first processor to provide the second boot program stored in the second memory to the first processor, and the boot control unit selects either one of the first boot programs stored in the first memories or the second boot program stored in the second memory so that the first processor executes either one of the first boot programs or the second boot program upon activation.

Preferably, the data processing device according to the present invention further comprises: a nonvolatile second memory that stores a second boot program for initialization after power-on; and a third bus, arranged between the second memory and the memory controller to provide the second boot program stored in the second memory to the first processors, that does not require initialization before use based on a boot program by the first processor, wherein the boot control unit selects either one of the first boot programs stored in the first memories or the second boot program stored in the second memory so that the first processors execute either one of the first boot programs or the second boot program upon activation.

Preferably, at least one of the first boot programs is a program that writes the second boot program to the second memory.

Preferably, the first memories are memories that are rewritable by the memory controller, and the data processing device further comprises: a third number of second processors, the third number being one or more; and the third number of fourth buses that are arranged between the second processors and the memory controller to provide at least one of the first boot programs that the memory controller writes in the first memories from the second processors to the memory controller.

Preferably, the first memories are memories that are rewritable by the memory controller, and the data processing device further comprises: a fourth number of large scale integrated circuit(s) (LSI(s)), the fourth number being one or more; and a fifth bus that is arranged between the LSI(s) and the memory controller, so as to provide at least one of the first boot programs that the memory controller writes in the first memories from at least one of the LSI(s) to the memory controller through the fifth bus.

Preferably, the data processing device according to the present invention further comprises: a transceiver that communicates in wired communication or wireless communication, wherein the transceiver receives a boot program transmitted from an external device storing the boot program, and stores the boot program in at least one of the first memories through at least one of the LSI(s), the fifth bus, and the memory controller, the transceiver receives a command transmitted from the external device, and transmits the command to the boot control unit through the LSI and the fifth bus, and at least one of the first processors executes the boot program according to the command.

According to the present invention, even when a serial bus requires initialization based on a boot program before use, the serial bus can be initialized without increasing the number of boot ROMs in accordance with the increase in the number of processors.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

[First Embodiment]

Figure 1:
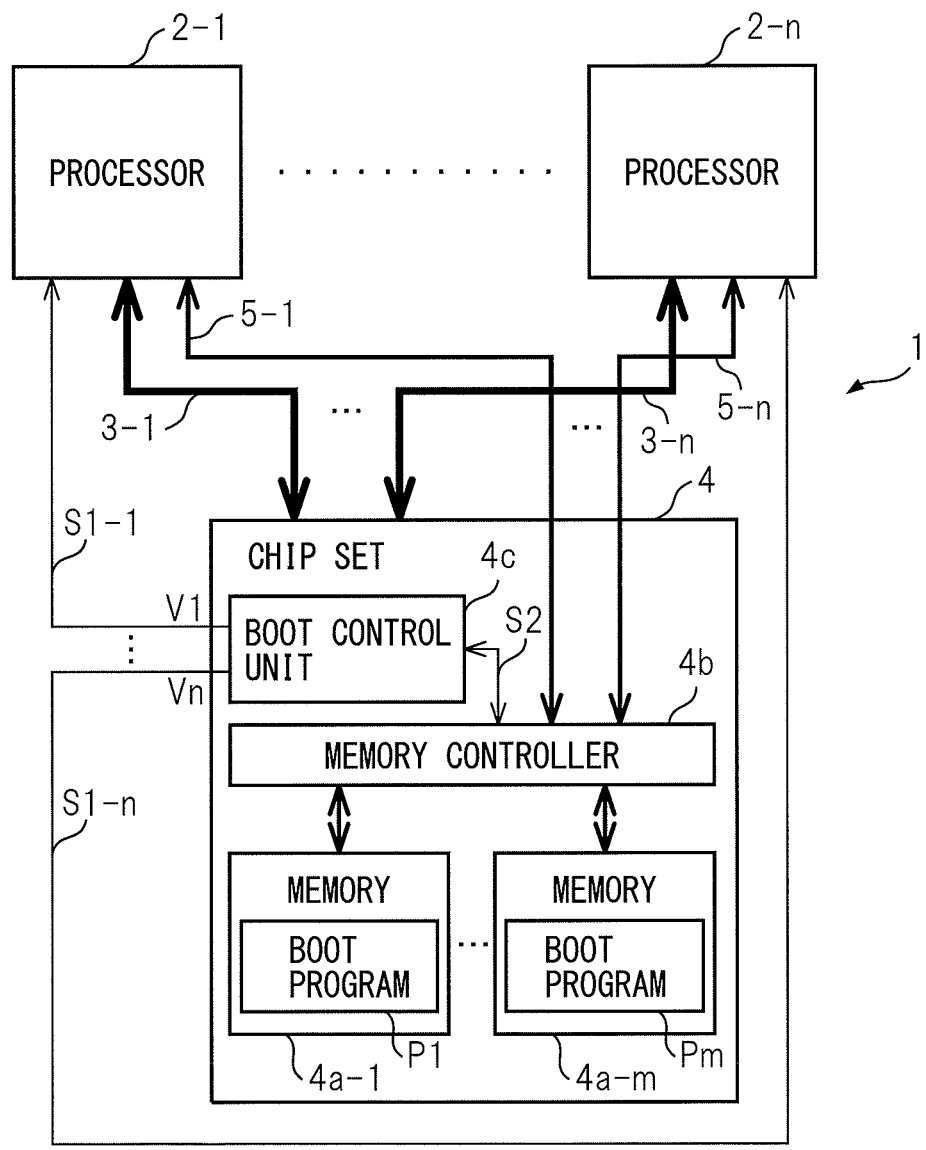
FIG. 1 is a block diagram of a first embodiment of a data processing device according to the present invention.

The data processing device according to the present invention will be described with reference to the drawings. In the drawings, the same components are denoted by the same signs. FIG. 1 is a block diagram of the first embodiment of the data processing device according to the present invention. The data processing device 1 depicted in FIG. 1 is a CNC, which comprises: processors 2-i (i=1, 2, ..., n) as n units of first processors where n is a first number (n is an integer two or more); serial buses 3-i (i=1, 2, ..., n) as n units of first buses; a chip set 4; and boot buses 5-i (i=1, 2, ..., n) as n units of second buses.

The respective processors 2-i perform initialization and a variety of processing after power-on. The initialization is performed based on boot programs Pj (j=1, 2, ..., m) as first boot programs that will be described later. The variety of processing includes tests based on a test program that checks if programs that are executed by processors 2-i (for example, the boot programs Pj) have errors. In the first embodiment, the processor 2-n works as the main processor, and the other processors work as sub-processors. The serial buses 3-i work as external buses that connect with corresponding processors 2-i and an external circuit (not depicted), which allows the processors 2-i to communicate data with the external circuit such as a Random Access Memory (RAM). The serial buses 3-i are configured by serial buses that require initialization by a processor based on a boot program before use. For example, each of the serial buses 3-i is a PCI Express and each of the processors 2-i is the root complexes of the PCI Express. A PCI Express is a serial bus that is initialized only by the root complex. Further, the boot programs Pj may be the same or different from one another.

The chip set 4 realizes predetermined functions such as reading and writing data in collaboration with the processors. The chip set 4 includes memories 4a-j (j=1, 2, ..., m) as m units of first memories where m is a second number (m is an integer two or more and less than n); a memory controller 4b; and a boot control unit 4c.

The memories 4a-j (j=1, 2, ..., m) store boot programs Pj, respectively. Further, the memories 4a-j (j=1, 2, ..., m) are configured by rewritable memories such as Dynamic Random Access Memory (DRAM), Static Random Access Memory (SRAM), and the like. The memory controller 4b reads out the instruction codes of the boot programs Pj from the memories 4a-j. The boot control unit 4c performs at least one of: controlling activation timing of the processors 2-i; controlling reboot timing of the processors 2-i; and controlling access to the boot buses 5-i.

In the first embodiment, the chip set 4 embeds the memories 4a-j, saving the mounting area and the costs of the memories 4a-j.

The boot buses 5-i respectively are arranged between the memory controller 4b and the processors 2-i so as to provide the instruction codes of the boot programs Pj read by the memory controller 4b to the processors 2-i (i=1, 2, ..., n). The boot buses 5-i do not require initialization by a processor based on a boot program before use. The boot buses 5-i may be serial buses, such as Serial Peripheral Interface (SPI) and Inter-Integrated Circuit ($I^2C$), or parallel buses, such as 8-bit universal buses and 16-bit universal buses that are used as interfaces for NOR flash memories.

In the first embodiment, upon activation of the processors 2-i (i=1, 2, ..., n) before using the serial buses 3-i, the corresponding processors 2-i respectively issue read requests of the boot programs to the memory controller 4b via the boot buses 5-i. In response to the read requests of the boot programs, the memory controller 4b reads out the instruction codes of the boot programs Pj (j=1, 2, ..., m) from the corresponding memories of the memories 4a-j, and provides the read instruction codes to the corresponding processors 2-i via the boot buses 5-i (i=1, 2, ..., n). Then, the processors 2-i (i=1, 2, ..., n) respectively initialize the serial buses 3-i by executing the boot programs Pj. Which memory of the memories 4a-j each processor 2-i reads out a boot program from, is determined in advance, or is determined in accordance with the setting of the chip set or the like.

Further, in the first embodiment, in order to issue read requests of boot programs, the boot control unit 4c performs at least one of: controlling activation timing of the processors 2-i; controlling reboot timing of the processors 2-i; and controlling access to the boot buses 5-i. For this purpose, the boot control unit 4c provides boot control signals Vi (i=1, 2, ..., n) for performing at least one of: controlling activation timing of the processors 2-i (i=1, 2, ..., n); controlling reboot timing of the processors 2-i; and controlling access to the boot buses 5-i, to the processors 2-i through at least ones of the signal lines S1-$i$ ($i$=1, 2, ..., n) and the boot buses 5-$i$. The boot control signals V$i$ may be at least either reset signals to the processors 2-$i$ or boot bus use permission signals that permit access from the processors 2-$i$ to the boot buses 5-$i$. FIG. 1 depicts a configuration where boot control signals V$i$ as reset signals are provided from the boot control unit 4$c$ through the signal lines S1-$i$ to the processors 2-$i$. On the other hand, when boot bus use permission signals are used as boot control signals V$i$, the boot control signals V$i$ are provided from the boot control unit 4$c$ to the processors 2-$i$ through the boot buses 5-$i$. Further, information is communicated between the memory controller 4$b$ and the boot control unit 4$c$ through a signal line S2 so that the boot control unit 4$c$ can perform at least one of: controlling activation timing of the processors 2-$i$; controlling reboot timing of the processors 2-$i$; and controlling access to the boot buses 5-$i$.

When only reset signals are used as the boot control signals V$i$, the boot control unit 4$c$ may assert the reset signals, which thereby makes the processors 2-$i$ stop reading the instruction codes of running programs and shift the internal states of the processors 2-$i$ to the initial states. When the internal states of the processors 2-$i$ are in the initial states, the memory controller 4$b$ stores the boot programs P$j$ with the data recorded in the registers and the memory at the time of stopping the reading of the instruction codes (neither is depicted) in the corresponding memories 4$a$-$j$.

However, if the boot control unit 4$c$ negates the reset signals (cancels the power-on reset), the processors 2-$i$ issue read requests to the boot buses 5-$i$. In response to the read requests, the memory controller 4$b$ reads out the boot programs P$j$ from the memories 4$a$-$j$. The read boot programs P$j$ are provided from the memory controller 4$b$ to the processors 2-$i$ through the boot buses 5-$i$. Then, the processors 2-$i$ execute the boot programs P$j$, thereby initializing the serial buses 3-$i$.

When only boot bus use permission signals are used as the boot control signals V$i$, if the boot control unit 4$c$ negates the boot bus use permission signals, the memory controller 4$b$ temporarily stops reading of the instruction codes of the programs being run by the processors 2-$i$. While temporarily stopping of reading of the instruction codes, the memory controller 4$b$ stores the boot programs P$j$ ($j$=1, 2, ..., m) to the corresponding memories 4$a$-$j$.

However, if the boot control unit 4$c$ asserts the boot bus use permission signals, the processors 2-$i$ issue read requests to the boot buses 5-$i$. In response to the read requests, the memory controller 4$b$ reads out the boot programs P$j$ from the memories 4$a$-$j$. The read boot programs P$j$ are provided from the memory controller 4$b$ to the processors 2-$i$ through the boot buses 5-$i$. Then, the processors 2-$i$ execute the boot programs P$j$, thereby initializing the serial buses 3-$i$.

When both boot bus use permission signals and reset signals are used as the boot control signals V$i$, if the boot control unit 4$c$ negates the boot bus use permission signals, the processors 2-$i$ temporarily stop reading the instruction codes of the running program. Thereafter, if the boot control unit 4$c$ asserts the reset signals, the internal states of the processors 2-$i$ shift to the initial states. When the internal states of the processors 2-$i$ are the initial states, the memory controller 4$b$ stores the boot programs P$j$ ($j$=1, 2, ..., m) to corresponding memories 4$a$-$j$.

However, if the boot control unit 4$c$ negates the reset signals and, thereafter, the boot control unit 4$c$ asserts the boot bus use permission signals, the processors 2-$i$ issue read requests to the boot buses 5-$i$. In response to the read requests, the memory controller 4$b$ reads out the boot programs P$j$ from the memories 4$a$-$j$. The read boot programs P$j$ are provided from the memory controller 4$b$ to the processors 2-$i$ through the boot buses 5-$i$. Then, the processors 2-$i$ execute the boot programs P$j$, thereby initializing the serial buses 3-$i$.

According to the first embodiment, instead of an external boot ROM equipped on the processors, memories 4$a$-$j$ embedded in the chip set 4 are used to initialize the serial buses 3-$i$. Therefore, the serial buses can be initialized without increasing the number of boot ROMs in accordance with increase in the number of processors. Thus, increase of the mounting area and the costs due to an increase in the number of boot ROMs along with an increase in the number of processors can be avoided.

[Second Embodiment]

Figure 2:
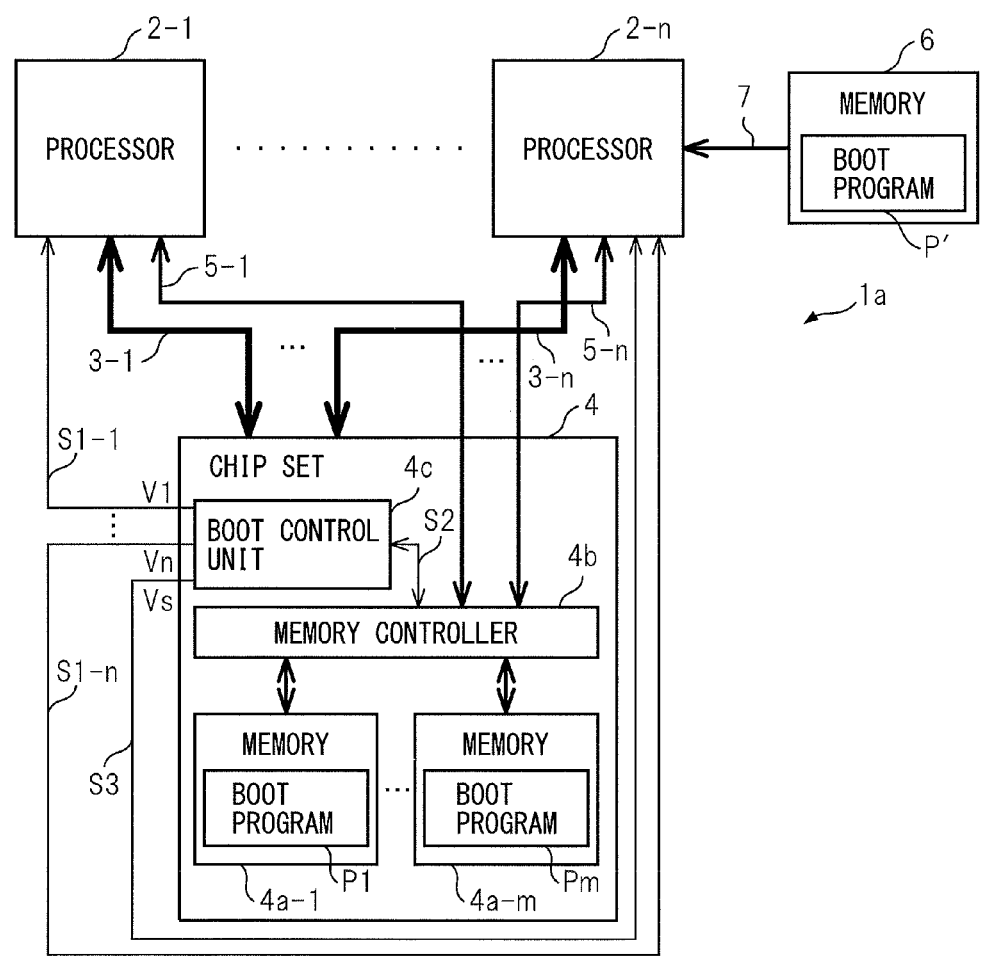
FIG. 2 is a block diagram of a second embodiment of the data processing device according to the present invention.

FIG. 2 is a block diagram of the second embodiment of the data processing device according to the present invention. The data processing device 1$a$ depicted in FIG. 2 is a CNC, which comprises: processors 2-$i$ ($i$=1, 2, ..., n; n is an integer two or more); serial buses 3-$i$ ($i$=1, 2, ..., n); a chip set 4; boot buses 5-$i$ ($i$=1, 2, ..., n); a memory 6 as a second memory, and a boot bus 7 as a third bus. In the second embodiment, the processor 2-n works as the main processor, and the other processors work as sub-processors.

The memory 6 is a nonvolatile memory that stores the instruction codes of a boot program P' that is a second boot program for initialization after power-on. In order for the memory 6 to store the instruction codes of the boot program P', the memory 6 may be either a non-rewritable memory that stores in advance the instruction codes of the boot program P', or a rewritable memory that is written in the instruction codes of the boot program P' by the processor 2-n. If the memory 6 is a rewritable memory that is written in the instruction codes of the boot program P' by the processor 2-n, the boot programs P$j$ ($j$=1, 2, ..., m; m is an integer two or more and less than n) also work as programs that write the boot program P' in the memory 6. The program P' is either the same program as the program P or a program different from the program P. If the program P' is different from the program P, the processor 2-n can execute different initialization programs.

The boot bus 7 is arranged between the memory 6 and the processor 2-n so as to provide the instruction codes of the boot program P' stored in the memory 6 to the processor 2-n. Further, the boot bus 7 does not require initialization by a processor based on a boot program before use.

In the second embodiment, the boot control unit 4$c$ selects either a boot program P$j$ or a boot program P' so that the processor 2-n executes, upon activation, either the boot program P$j$ stored in a corresponding memory of the memories 4$a$-$j$ or the boot program P' stored in the memory 6. For this purpose, the boot control unit 4$c$ provides a boot program selection signal Vs for selecting either a boot program P$j$ or a boot program P' to the corresponding processors 2-$i$ through the boot buses 5-$i$. In FIG. 2, for clarification, a signal line S3 denotes provision of a boot program selection signal Vs from the boot control unit 4$c$ to the processor 2-n. For example, if the processor 2-n can not read the boot program P' due to a failure of the memory 6, a boot program P$j$ stored in a corresponding memory of the memories 4$a$-$j$ is selected.

When a failure occurs to the memory 6 and only reset signals are used as boot control signals V$i$ ($i$=1, 2, ..., n), if the boot control unit 4$c$ asserts the reset signals, the processors 2-$i$ stop reading the instruction codes of the running programs, and the internal states of the processors 2-$i$ shift to the initial states. When the internal states of the processors 2-$i$ are the initial states, the memory controller 4$b$ stores the boot programs P$j$ to the corresponding memories 4$a$-$j$.

However, if the boot control unit 4$c$ negates the reset signals (cancels the power-on reset), the processors 2-$i$ ($i$=1, 2, ..., n) issue read requests to the boot buses 5-$i$. In response to the read requests, the memory controller 4b reads out boot programs Pj from the corresponding memories. These read instruction codes and data are provided from the memory controller 4b to the processors 2-i through the boot buses 5-i. Then, the processors 2-i execute the boot programs Pj (j=1, 2, . . . , m), thereby initializing the corresponding serial buses 3-i.

When a failure occurs in the memory 6 and only boot bus use permission signals are used as boot control signals Vi, if the boot control unit 4c negates the boot bus use permission signals, the processors 2-i temporarily stop reading the instruction codes of the running programs. While the processors 2-i are temporarily stopping reading the instruction codes, the memory controller 4b stores the boot programs Pj (j=1, 2, . . . , m) to the corresponding memories 4a-j.

However, if the boot control unit 4c asserts the boot bus use permission signals, the processors 2-i issue read requests to the boot buses 5-i. In response to the read requests, the memory controller 4b reads out the boot programs Pj from the memories 4a-j. The read boot programs Pj are provided from the memory controller 4b to the processors 2-i through the boot buses 5-i. Then, the processors 2-i execute the boot programs Pj, thereby initializing the serial buses 3-i.

When a failure occurs to the memory 6 and both of reset signals and boot bus use permission signals are used as boot control signals Vi, if the boot control unit 4c negates the boot bus use permission signals, the processors 2-i temporarily stop reading the instruction codes of the running programs, and, thereafter, the boot control unit 4c asserts the reset signals. As a result, the internal states of the processors 2-i shift to the initial states. When the internal states of the processors 2-i are the initial states, the memory controller 4b stores the boot programs Pj (j=1, 2, . . . , m) to the corresponding memories 4a-j.

However, if the boot control unit 4c negates the reset signals, and, thereafter, the boot control unit 4c asserts the boot bus use permission signals, the processors 2-i issue read requests to the boot buses 5-i. In response to the read requests, the memory controller 4b reads out the boot programs Pj from the memories 4a-j. The read boot programs Pj are provided from the memory controller 4b to the processors 2-i through the boot buses 5-i. Then, the processors 2-i execute the boot programs Pj, thereby initializing the serial buses 3-i.

According to the second embodiment, even when a failure occurs to the memory 6, the processors 2-i can execute the boot programs Pj stored in the memories 4a-j, whereby the serial buses 3-i can be initialized. In this way, the processors 2-i can execute arbitrary test programs whether a failure occurs to the memory 6 or not, and the locations of the errors of the programs executed by the processors 2-i can be identified.

[Third Embodiment]

Figure 3:
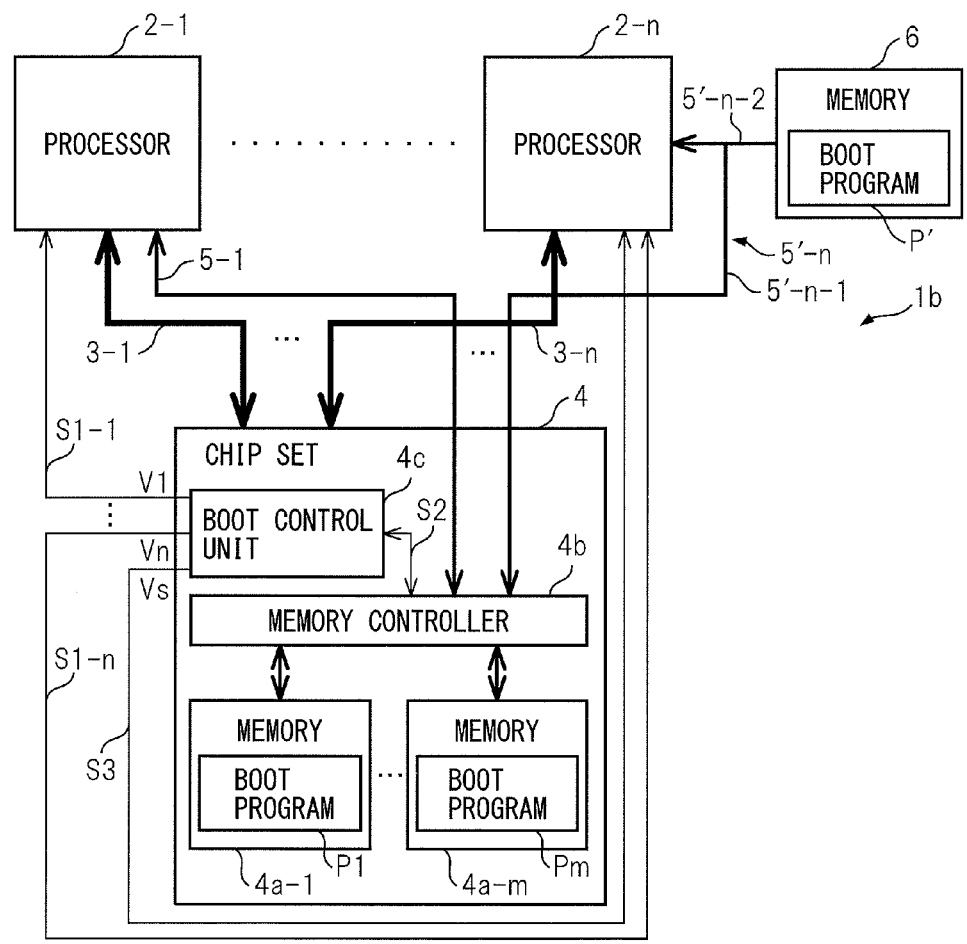
FIG. 3 is a block diagram of a third embodiment of the data processing device according to the present invention.

FIG. 3 is a block diagram of the third embodiment of the data processing device according to the present invention. The data processing device 1b depicted in FIG. 3 is a CNC, which comprises: processors 2-i (i=1, 2, . . . , n; n is an integer two or more); serial buses 3-i (i=1, 2, . . . , n); a chip set 4; boot buses 5-1, . . . , 5'-n; and a memory 6. In the third embodiment, the processor 2-n works as the main processor, and the other processors work as sub-processors.

The boot bus 5'-n includes: a first portion 5'-n-1 that is arranged between the memory controller 4b and the processor 2-n so as to provide the boot programs Pj (j=1, 2, . . . , m; m is an integer two or more and less than n) read by the memory controller 4b to the processor 2-n; and a second portion 5'-n-2 that is arranged between the memory 6 and the processor 2-n so as to provide the boot program P' stored in the memory 6 to the processor 2-n. Further, the boot bus 5'-n does not require initialization by a processor based on a boot program before use.

According to the third embodiment, similarly to the above second embodiment, even when a failure occurs in the memory 6, the processors 2-i can execute the boot programs Pj stored in the memories 4a-j, whereby the serial buses 3-i can be initialized. In this way, the processors 2-i can execute arbitrary test programs whether a failure occurs to the memory 6 or not, and the locations of the errors of the programs executed by the processors 2-i can be identified.

[Fourth Embodiment]

Figure 4:
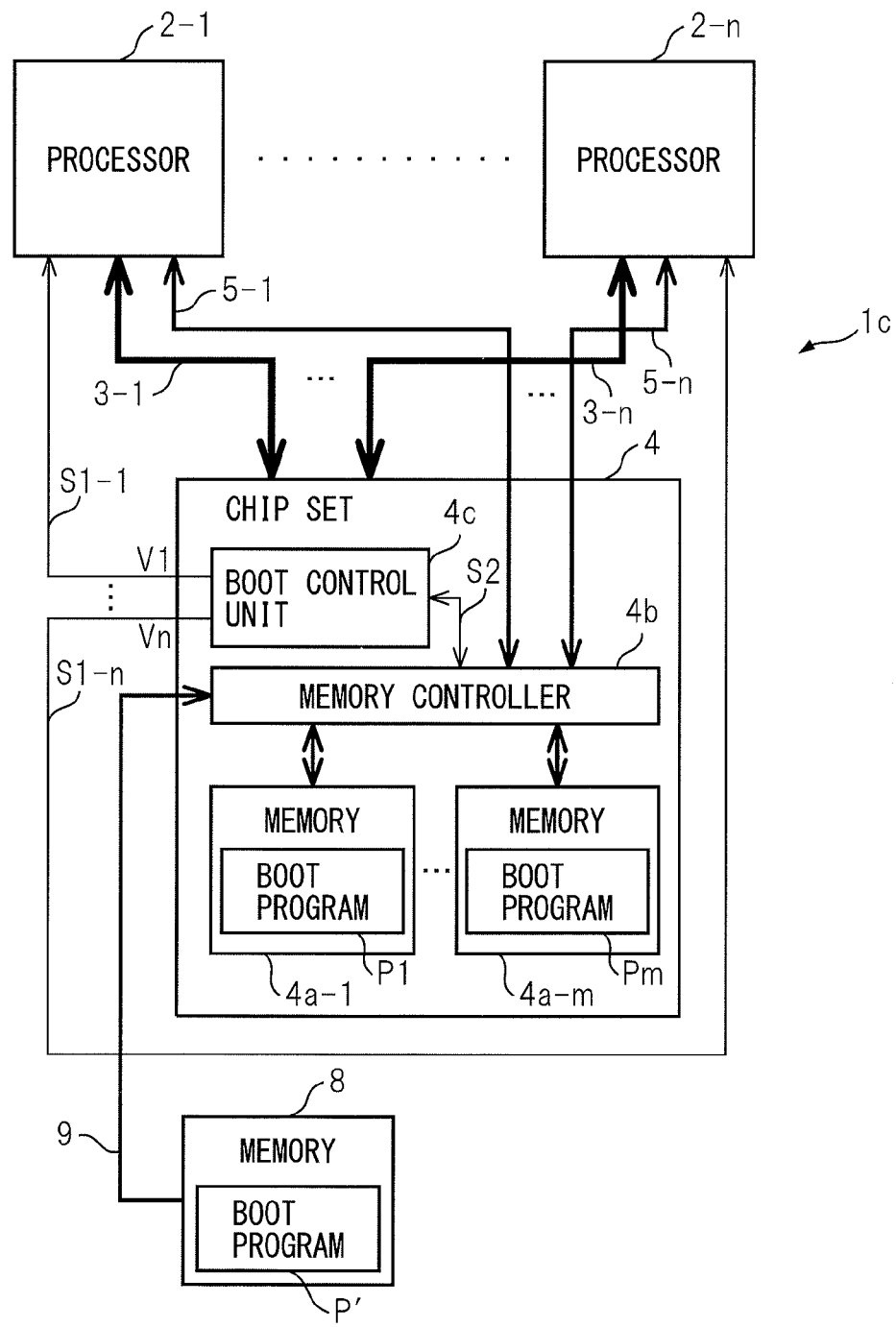
FIG. 4 is a block diagram of a fourth embodiment of the data processing device according to the present invention.

FIG. 4 is a block diagram of the fourth embodiment of the data processing device according to the present invention. The data processing device 1c depicted in FIG. 4 is a CNC, which comprises: processors 2-i (i=1, 2, . . . , n; n is an integer two or more); serial buses 3-i (i=1, 2, . . . , n); a chip set 4; boot buses 5-i (i=1, 2, . . . , n); a memory 8 as a second memory; and a boot bus 9 as a third bus. In the fourth embodiment, the processor 2-n works as the main processor, and the other processors work as sub-processors.

The memory 8 is a nonvolatile memory that stores the instruction codes of a boot program P'. In order for the memory 8 to store the instruction codes of the boot program P', the memory 8 may be either a non-rewritable memory that stores in advance the instruction codes of the boot program P', or a rewritable memory that is written in the instruction codes of the boot program P' by the processor 2-n. If the memory 8 is a rewritable memory that is written in the instruction codes of the boot program P' by the processor 2-n, the boot programs Pj also work as programs that write the boot program P' in the memory 8.

The boot bus 9 is arranged between the memory 8 and the memory controller 4b so as to provide the boot program P' stored in the memory 8 to the memory controller 4b. Further, the boot bus 9 does not require initialization by a processor based on a boot program before use.

In the fourth embodiment, the boot control unit 4c selects either a boot program Pj stored in a corresponding memory of the memories 4a-j or a boot program P' stored in the memory 8 so that the processor 2-n executes a boot program upon activation. If the processor 2-n could not read the boot program P' due to a failure of the memory 8, the boot control unit 4c selects a boot program Pj stored in the corresponding memory of the memories 4a-j.

When a failure occurs to the memory 8 and only reset signals are used as boot control signals Vi (i=1, 2, . . . , n), if the boot control unit 4c asserts the reset signals, the processors 2-i temporarily stop reading the instruction codes of the running program. While the processors 2-i are temporarily stopping reading the instruction codes, the memory controller 4b stores the boot programs Pj to the corresponding respective memories.

Meanwhile, if the boot control unit 4c negates the reset signals (cancels the power-on reset), the processors 2-i issue read requests to the boot buses 5-i. In response to the read requests, the memory controller 4b reads out the boot programs Pj from the corresponding memories. These read instruction codes and data are provided from the memory controller 4b to the corresponding processors 2-i through the boot buses 5-i (i=1, 2, . . . , n). Then, the processors 2-i execute the boot programs Pj (j=1, 2, . . . , m), thereby initializing the corresponding serial buses 3-i.

When a failure occurs to the memory 8 and only boot bus use permission signals are used as boot control signals Vi, if the boot control unit 4c negates the boot bus use permission signals, the processors 2-i temporarily stop reading the instruction codes of the running program. While the processors 2-i are temporarily stopping reading the instruction codes, the memory controller 4b stores the boot programs Pj to the corresponding memories 4a-j.

Meanwhile, if the boot control unit 4c asserts the boot bus use permission signals, the memory controller 4b reads out the boot programs Pj from the memories 4a-j. The read boot programs Pj are provided from the memory controller 4b to the processors 2-i through the boot buses 5-i. Then, the processors 2-i execute the boot programs Pj, thereby initializing the serial buses 3-i.

When a failure occurs to the memory 8 and both of reset signals and boot bus use permission signals are used as boot control signals Vi, if the boot control unit 4c negates the boot bus use permission signals, the processors 2-i temporarily stop reading the instruction codes of the running programs, and, thereafter, the boot control unit 4c asserts the reset signals. As a result, the internal states of the processors 2-i shift to the initial states. When the internal states of the processors 2-i are the initial states, the memory controller 4b stores the boot programs Pj in the corresponding memories 4a-j.

However, if the boot control unit 4c negates the reset signals, and, thereafter, the boot control unit 4c asserts the boot bus use permission signals, the processors 2-i issue read requests to the boot buses 5-i. In response to the read requests, the memory controller 4b reads out the boot programs Pj from the memories 4a-j. These read instruction codes and data are provided from the memory controller 4b to the processors 2-i through the boot buses 5-i. Then, the processors 2-i execute the respective boot programs Pj, thereby initializing the corresponding serial buses 3-i.

According to the fourth embodiment, even when a failure occurs to either the boot programs Pj stored in the memories 4a-j or the boot program P' stored in the memory 8, the processors 2-i still can initialize the serial buses 3-i. In this way, the locations of the errors of the programs executed by the processors 2-i can be identified.

[Fifth Embodiment]

Figure 5:
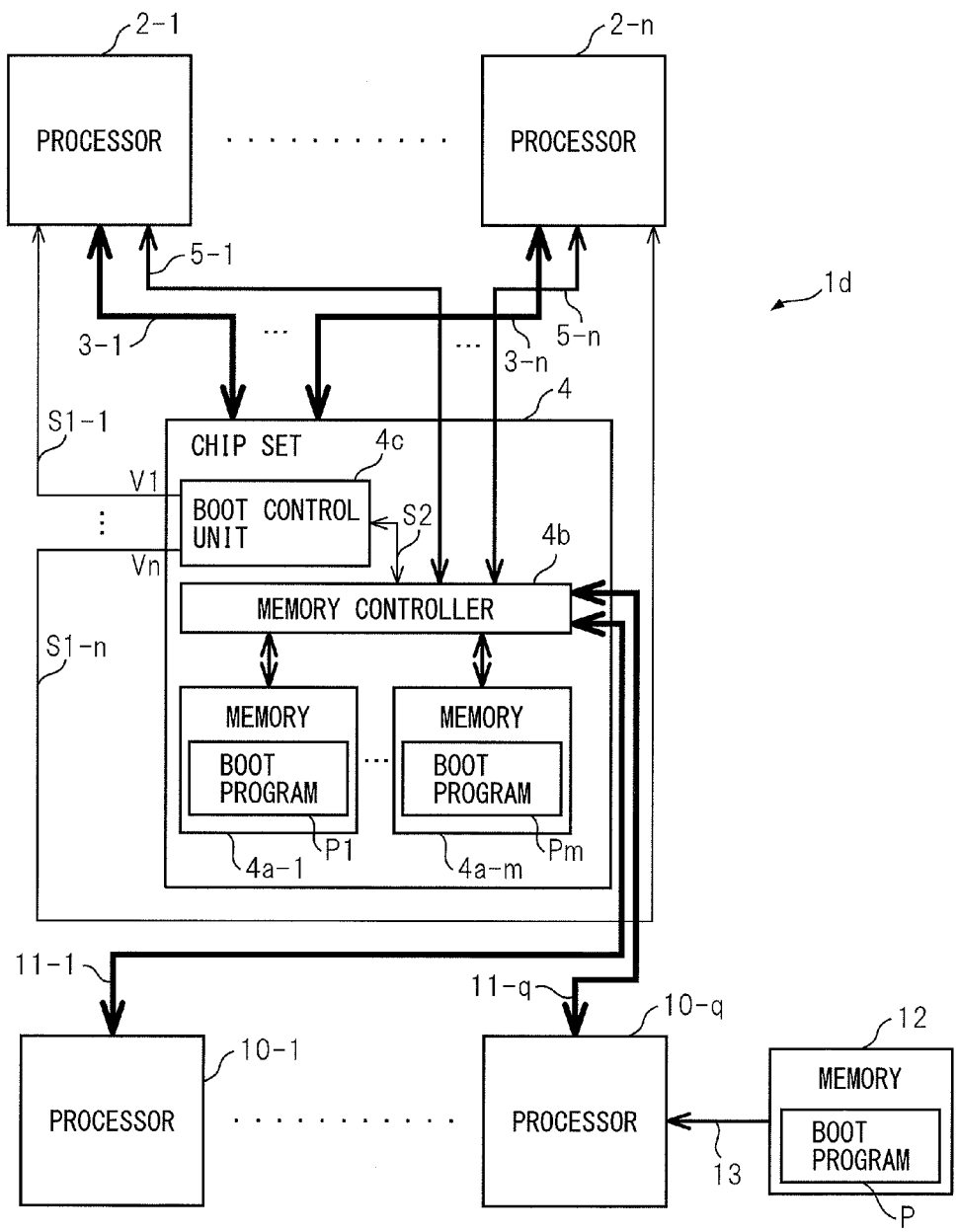
FIG. 5 is a block diagram of a fifth embodiment of the data processing device according to the present invention.

FIG. 5 is a block diagram of the fifth embodiment of the data processing device according to the present invention. The data processing device 1d depicted in FIG. 5 is a CNC, which comprises: processors 2-i (i=1, 2, . . . , n; n is an integer two or more); serial buses 3-i (i=1, 2, . . . , n); a chip set 4; boot buses 5-i (i=1, 2, . . . , n); processors 10-k. (k=1, 2, . . . , q) as q units of second processors where q is a third number (q is an integer one or more); buses 11-k. as q units of fourth buses; a memory 12; and a boot bus 13.

The respective processors 10-k. perform a variety of processing including: initialization based on a boot program P for initializing the data processing device 1d after powering thereon; and tests based on a test program that checks whether programs (for example, the boot program P) that are executed by the processors 10-k. have errors. In the fifth embodiment, the processors 2-i work as digital signal processors (DSP), the processor 10-q works as the main processor, and the other processors work as sub-processors. The boot buses 11-k. are arranged between the processor 10-k. and the memory controller 4b so as to provide boot programs Pj (j=1, 2, . . . , m; m is an integer two or more and less than n) that the memory controller 4b writes in the memories 4a-j from the processor 10-q to the memory controller 4b. Further, the boot buses 11-k. may or may not require initialization by a processor based on a boot program before use, and may be serial buses or parallel buses.

The memory 12 is a nonvolatile memory that stores the instruction codes of the boot program P. In order for the memory 12 to store the instruction codes of the boot program P, the memory 12 may be either a non-rewritable memory that stores in advance the instruction codes of the boot program P, or a rewritable memory that is written in the instruction codes of the boot program P by the processor 10-q.

The boot bus 13 is arranged between the memory 12 and the processor 10-q so as to provide the boot program P stored in the memory 12 to the processor 10-q. Further, the boot bus 13 does not require initialization by a processor based on a boot program before use.

The instruction codes of the program P provided to the memory controller 4b and the data of update boot programs read by the memory controller 4b are provided from the memory controller 4b to the respective processors 2-i through the boot buses 5-i (i=1, 2, . . . , n). The processors 2-i execute the boot programs Pj and the update boot programs, thereby initializing the corresponding serial buses 3-i.

According to the fifth embodiment, the boot program P stored in the memory 12 can be written in the memories 4a-j without writing using special equipment such as a ROM writer.

[Sixth Embodiment]

Figure 6:
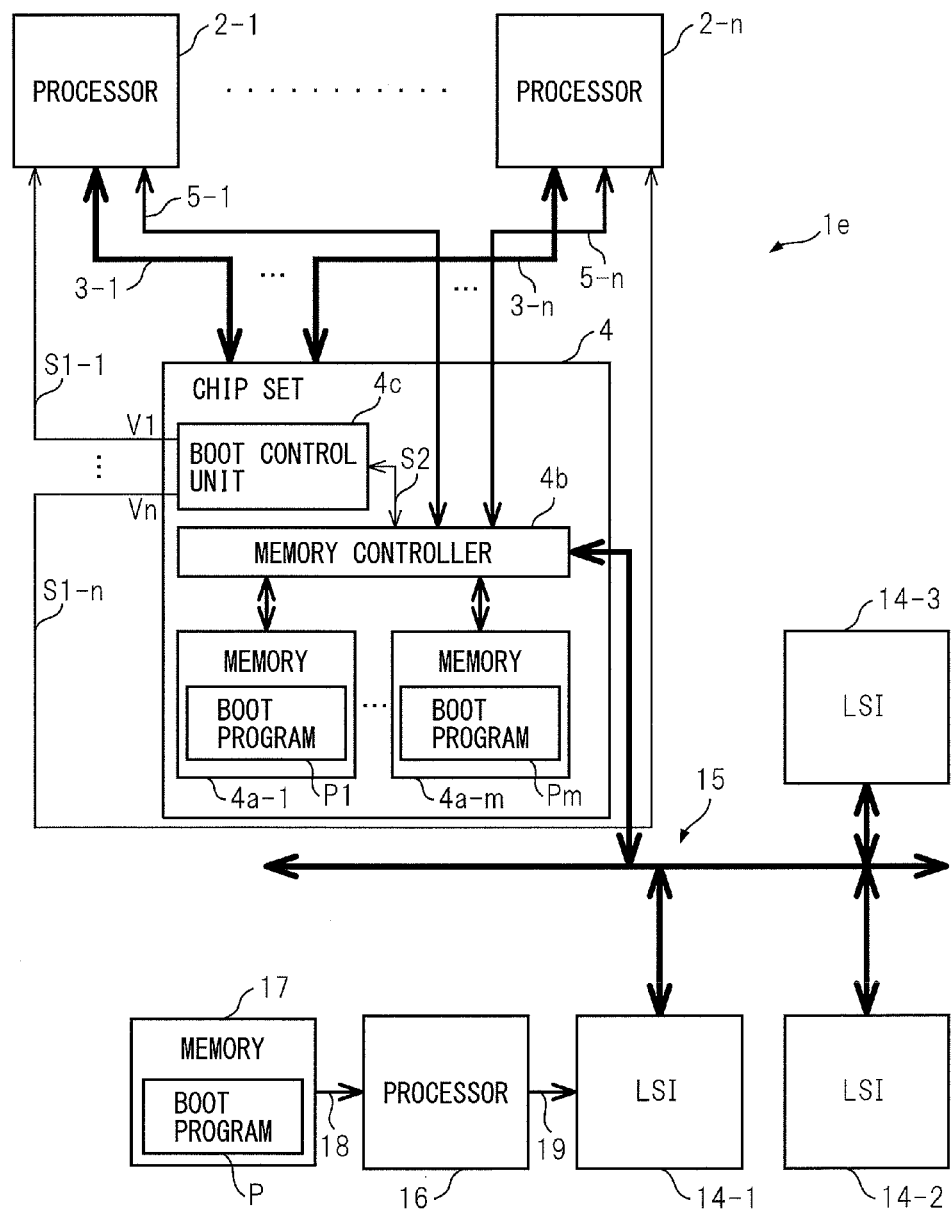
FIG. 6 is a block diagram of a sixth embodiment of the data processing device according to the present invention.

FIG. 6 is a block diagram of the sixth embodiment of the data processing device according to the present invention. The data processing device 1e depicted in FIG. 6 is a CNC, which comprises: processors 2-i (i=1, 2, . . . , n; n is an integer two or more); serial buses 3-i (i=1, 2, . . . , n); a chip set 4; boot buses 5-i (i=1, 2, . . . , n); one unit of LSI 14-1, where one is a fourth number; a system bus 15 as a fifth bus; a processor 16; a memory 17; a boot bus 18; and a bus 19.

The LSI 14-1 works as a bridge between the bus 19 and the system bus 15. The LSI 14-1 converts the whole or part of transactions on the bus 19, that use the LSI 14-1 as a slave, into transactions on the system bus 15, that use the LSI 14-1 as a master. The LSI 14-1 converts the whole or part of transactions on the system bus 15, that uses the LSI 14-1 as a slave, into transactions on the bus 19, that uses the LSI 14-1 as a master.

The system bus 15 is arranged between the LSI 14-1 and the memory controller 4b so as to provide the instruction codes of the boot program Pj that the memory controller 4b writes in the memories 4a-j (j=1, 2, . . . , m; m is an integer two or more and less than n) from the LSI 14-1 to the memory controller 4b. Further, other than LSI 14-1, the system bus 15 may be connected with LSI 14-2, LSI 14-3, as depicted in FIG. 6.

The processor 16 performs a variety of processing including: initialization based on a boot program P for initializing the data processing device 1e after power-on; and tests based on a test program that checks whether programs (for example, the boot program P) that are executed by the processor 16 have errors. In the sixth embodiment, the processors 2-i work as either DSP or sub-processors, and the processor 16 works as the main processor.

The memory 17 is a nonvolatile memory that stores the instruction codes of a boot program P that correspond to any of the boot programs Pj to be written in the memories 4a-j. In order for the memory 17 to store the instruction codes of the boot program P, the memory 17 may be either a non-rewritable memory that stores in advance the instruction codes of the boot program P, or a rewritable memory that is written in the instruction codes of the boot program P by the memory controller 4b.

The boot bus 18 is arranged between the memory 17 and the processor 16 so as to provide the instruction codes of the boot program P stored in the memory 17 to the processor 16. The bus 19 is arranged between the processor 16 and the LSI 14-1 so as to provide the instruction codes of the boot program P provided to the processor 16, to the LSI 14-1. Further, the boot bus 18 does not require initialization by the processor 16 based on the boot program P before use.

In the sixth embodiment, in order to issue a read request of the boot program, the boot control unit 4c performs at least one of: controlling activation timing of the processors 2-i; controlling reboot timing of the processors 2-i; and controlling access to the boot buses 5-i, according to a command from the processor 16 via the bus 19, the LSI 14-1, and the system bus 15. For this purpose, the boot control unit 4c provides boot control signals Vi (i=1, 2, ..., n) for performing at least one of: controlling activation timing of the processors 2-i (i=1, 2, ..., n); controlling reboot timing of the processors 2-i; and controlling access to the boot buses 5-i, to the processors 2-i through signal lines S1-i. The boot control signals Vi may be at least either reset signals to the processors 2-i or boot bus use permission signals that permit access from the processors 2-i to the boot buses 5-i. Further, information is communicated between the memory controller 4b and the boot control unit 4c through a signal line S2 so that the boot control unit 4c can perform at least one of: controlling activation timing of the processors 2-i; controlling reboot timing of the processors 2-i; and controlling access to the boot buses 5-i.

When only reset signals are used as boot control signals Vi, if the boot control unit 4c asserts the reset signals according to a command from the processor 16 via the bus 19, the LSI 14-1, and the system bus 15, the processors 2-i stop reading the instruction codes of the running programs, and the internal states of the processors 2-i shift to the initial states. When the internal states of the processors 2-i are the initial states, either a DMA controller or a processor core embedded in a device on the system bus 15, or the processor 16, transfers the boot program P from the nonvolatile memory 17 or a nonvolatile memory embedded in or connected with the device on the system bus 15 to the memory controller 4b. The memory controller 4b stores the boot program P in all or part of the memories 4a-j (j=1, 2, ..., m).

However, if the boot control unit 4c negates the reset signals (cancels the power-on reset) according to a command from the processor 16 via the bus 19, the LSI 14-1, and the system bus 15, the processors 2-i (i=1, 2, ..., n) respectively initialize the serial buses 3-i by reading the instruction codes of the boot programs Pj (j=1, 2, ..., m) from the memories 4a-j through the boot buses 5-i and executing the instruction codes.

When only boot bus use permission signals are used as boot control signals Vi, if the boot control unit 4c negates the boot bus use permission signals according to a command from the processor 16 via the bus 19, the LSI 14-1, and the system bus 15, the processors 2-i stop reading the instruction codes of the running programs. While the processors 2-i are stopping reading the instruction codes, either a DMA controller or a processor core embedded in a device on the system bus 15, or the processor 16, transfers the boot program P from the nonvolatile memory 17 or a nonvolatile memory embedded in or connected with the device on the system bus 15 to the memory controller 4b. The memory controller 4b stores the boot program P in all or part of the memories 4a-j (j=1, 2, ..., m).

However, if the boot control unit 4c asserts the boot bus use permission signals according to a command from the processor 16 via the bus 19, the LSI 14-1, and the system bus 15, the processors 2-i respectively initialize the serial buses 3-i by reading the instruction codes of the boot program Pj from the memories 4a-j through the boot buses 5-i and executing the instruction codes.

When both boot bus use permission signals and reset signals are used as the boot control signals Vi, if the boot control unit 4c negates the boot bus use permission signals according to a command from the processor 16 via the bus 19, the LSI 14-1, and the system bus 15, the processors 2-i temporarily stop reading the instruction codes of the running programs. Thereafter, when the boot control unit 4c asserts the reset signals, the internal states of the processors 2-i shift to the initial states. When the internal states of the processors 2-i are in the initial states, either a DMA controller or a processor core embedded in a device on the system bus 15, or the processor 16 transfers the boot program P from the nonvolatile memory 17 or a nonvolatile memory embedded in or connected with the device on the system bus 15 to the memory controller 4b. The memory controller 4b stores the boot program P to the corresponding memories 4a-j (j=1, 2, ..., m).

However, if the boot control unit 4c negates the reset signals and, thereafter, asserts the boot bus use permission signals, according to a command from the processor 16 via the bus 19, the LSI 14-1, and the system bus 15, the processors 2-i (i=1, 2, ..., n) respectively initialize the serial buses 3-i by reading the instruction codes of the boot programs Pj (j=1, 2, ..., m) from the memories 4a-j through the boot buses 5-i and executing the instruction codes.

According to the sixth embodiment, the instruction codes of a boot program P stored in the memory 17 or the instruction codes of boot programs Pj stored in a nonvolatile memory embedded in or connected with a device on the system bus 15 can be written in the memories 4a-j without writing using a special equipment such as a ROM writer.

[Seventh Embodiment]

Figure 7:
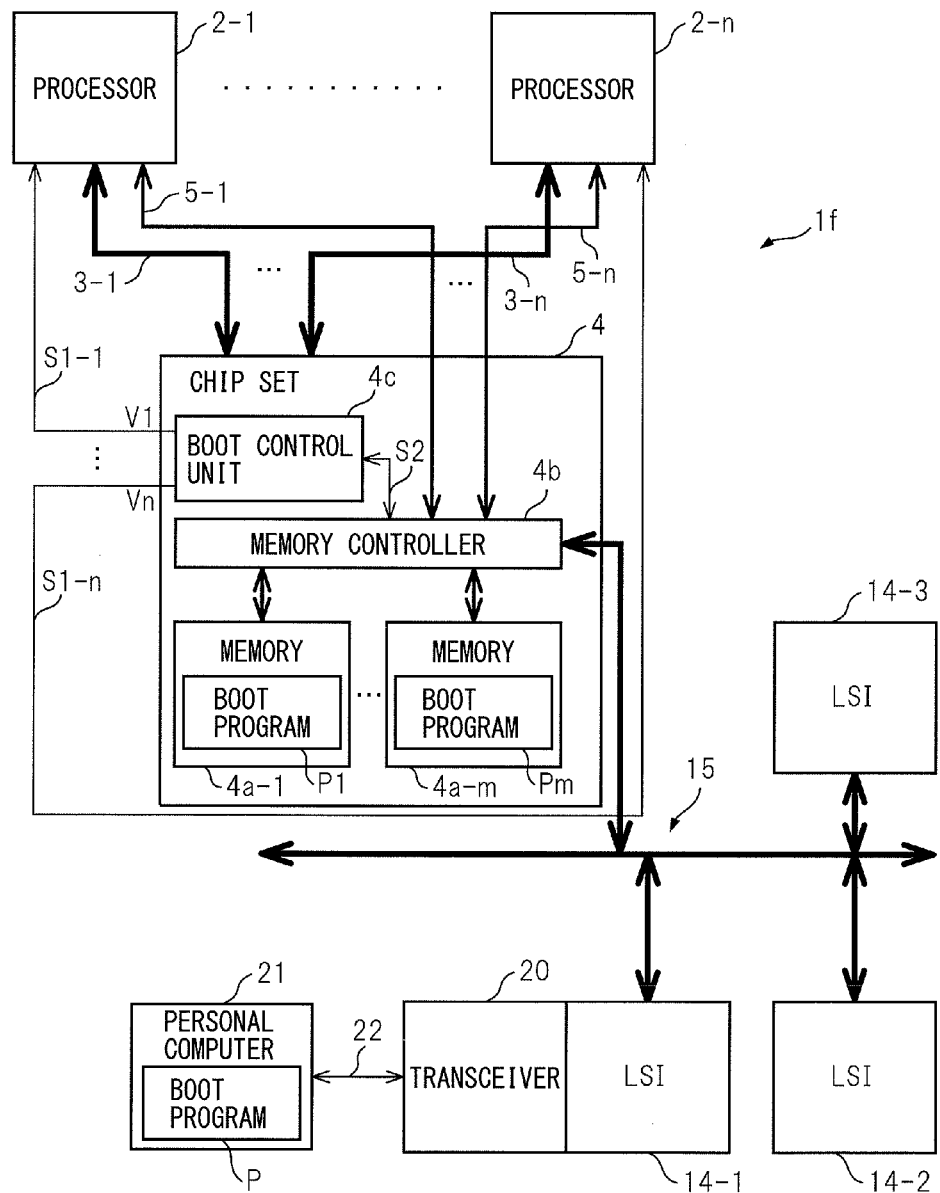
FIG. 7 is a block diagram of a seventh embodiment of the data processing device according to the present invention.

FIG. 7 is a block diagram of the seventh embodiment of the data processing device according to the present invention. The data processing device 1f depicted in FIG. 7 is a CNC, which comprises: processors 2-i (i=1, 2, ..., n; n is an integer two or more); serial buses 3-i (i=1, 2, ..., n); a chip set 4; boot buses 5-i (i=1, 2, ..., n); an LSI 14-1; a system bus 15; and a transceiver 20. In the seventh embodiment, the processor 2-n works as the main processor, and the other processors work as sub-processors.

The boot program P stored in a personal computer 21 as an external device corresponds to any one of the boot programs Pj that are written in the memories 4a-j (j=1, 2, ..., m; m is an integer two or more and less than n). The transceiver 20 transmits and receives data to and from the personal computer 21 through a wired communication path 22 so as to store the boot program P stored in the personal computer 21 into the memories 4a-j through the LSI 14-1, the system bus 15, and the memory controller 4b, and to convey a command transmitted from the personal computer 21 to the boot control unit 4c through the LSI 14-1 and the system bus 15. In this way, the processors 2-i execute the instruction codes of the boot program Pj according to the command transmitted from the personal computer 21.

For example, the LSI 14-1 is a High Speed Serial Bus (HSSB) control LSI, the transceiver 20 is an optical connector, and the communication path 22 is a high-speed serial communication bus.

When only reset signals are used as the boot control signals Vi (i=1, 2, ..., n), if the boot control unit 4c asserts the reset signals according to a command from the personal computer 21 via the communication path 22, the transceiver 20, the LSI 14-1, and the system bus 15, the processors 2-i stop reading the instruction codes of the running programs, and the internal states of the processors 2-i shift to the initial states. When the internal states of the processors 2-i are the initial states, either a DMA controller or a processor core embedded in a device on the system bus 15, or the personal computer 21 transfers the boot program P from the device on the system bus 15 or from a nonvolatile memory embedded in or connected with the personal computer 21 to the memory controller 4b. The memory controller 4b stores the boot program P in the corresponding memories 4a-j (j=1, 2, . . . , m).

However, if the boot control unit 4c negates the reset signals (cancels the power-on reset) according to a command from the personal computer 21 via the communication path 22, the transceiver 20, the LSI 14-1, and the system bus 15, the processors 2-i (i=1, 2, . . . , n) respectively initialize the serial buses 3-i by reading the instruction codes of the boot programs Pj (j=1, 2, . . . , m) from the memories 4a-j through the boot buses 5-i and executing the instruction codes.

When only boot bus use permission signals are used as boot control signals Vi, if the boot control unit 4c negates the boot bus use permission signals according to a command from the personal computer 21 via the communication path 22, the transceiver 20, the LSI 14 1, and the system bus 15, the processors 2-i stop reading the instruction codes of the running programs. While the processors 2-i stop reading the instruction codes, either a DMA controller or a processor core embedded in a device on the system bus 15, or the personal computer 21, transfers the boot program P from the device on the system bus 15 or from a nonvolatile memory embedded in or connected with the personal computer 21 to the memory controller 4b. The memory controller 4b stores the boot program P in the corresponding memories 4a-j (j=1, 2, . . . , m).

However, if the boot control unit 4c asserts the boot bus use permission signals according to a command from the personal computer 21 via the communication path 22, the transceiver 20, the LSI 14-1, and the system bus 15, the processors 2-i (i=1, 2, . . . , n) respectively initialize the serial buses 3-i by reading the instruction codes of the boot programs Pj from the memories 4a-j (j=1, 2, . . . , m) through the boot buses 5-i and executing the instruction codes.

When both of boot bus use permission signals and reset signals are used as boot control signals Vi, if the boot control unit 4c negates the boot bus use permission signals according to a command from the personal computer 21 via the communication path 22, the transceiver 20, the LSI 14-1, and the system bus 15, the processors 2-i temporarily stop reading the instruction codes of the running programs. Thereafter, when the boot control unit 4c asserts the reset signals, the internal states of the processors 2-i shift to the initial states. When the internal states of the processors 2-i are in the initial states, either a DMA controller or a processor core embedded in a device on the system bus 15, or the personal computer 21 transfers the boot program P from the device on the system bus 15 or from a nonvolatile memory embedded in or connected to the personal computer 21 to the memory controller 4b. The memory controller 4b stores the boot program P to the corresponding memories 4a-j (j=1, 2, . . . , m).

However, if the boot control unit 4c negates the reset signals and, thereafter, asserts the boot bus use permission signals, according to a command from the personal computer 21 via the communication path 22, the transceiver 20, the LSI 14-1, and the system bus 15, the processors 2-i (i=1, 2, . . . , n) respectively initialize the serial buses 3-i by reading the instruction codes of the boot programs Pj (j=1, 2, . . . , m) from the memories 4a-j through the boot buses 5-i and executing the instruction codes.

According to the seventh embodiment, the processors 2-i can be activated by the boot program P provided from the personal computer 21. Further, by executing, as a boot program, a program that writes the boot program P' in the memory 6 of FIG. 2 or the memory 8 of FIG. 4, neither depicted in FIG. 7, the memory 6 or the memory 8 can be written in without writing operation using a special equipment such as a ROM writer.

The present invention is not limited to the above embodiments, and can be changed or modified in many ways. For example, while, in the above first to seventh embodiments, cases where data processing devices 1, 1a, 1b, 1c, 1d, 1e, and 1f are CNC are described, the data processing devices 1, 1a, 1b, 1c, 1d, 1e, and 1f may be robot controllers or the like.

While, in the above first to seventh embodiments, a case where n is an integer of two or more is described, n may be one. Likewise, in the above first to seventh embodiments, a case where m is an integer of two or more and less than n is described, m may be one or two or more and the same integer as n. Further, while, in the fifth embodiment, a case where q is an integer of two or more is described, q may be one.

Further, while, in the above first to seventh embodiments, a case where the serial buses 3-i (i=1, 2, . . . , n) are connected with the chip set 4 is described, the serial buses 3-i may be connected with components other than the chip set 4.

The processors 2-i (i=1, 2, . . . , n), 10-k. (k=1, 2, . . . , q), and 16, may be configured by System-on-a-chip (SoC) that embed a processor core or a DMA controller. In such a case, for the processors 2-i to access the serial buses 3-i, the processor core or the DMA controller accesses the serial buses 3-i.

While a case where the memories 4a-j (j=1, 2, . . . , m) are configured by rewritable memories such as DRAM or SRAM, is described in the above first embodiment, the memories 4a-j may be configured by non-rewritable memories.

While, according to the above description, when both of reset signals and boot bus use permission signals are used as the boot control signals Vi, assertion of boot bus use permission signals, negation of reset signals, negation of boot bus use permission signals, and assertion of reset signals are performed in order, negation of boot bus use permission signals, assertion of reset signals, negation of reset signals, and assertion of boot bus use permission signals may be performed in order, or assertion of reset signals, negation of boot bus use permission signals, negation of reset signals, and assertion of boot bus use permission signals may be performed in order. Further, when the default state immediately after power-on is negation of boot bus use permission signals and assertion of reset signals, negation of reset signals and assertion of boot bus use permission signals may be performed in order. When the default state immediately after power-on is negation of boot bus use permission signals and reset signals, assertion of boot bus use permission signals can be performed.

While a case where serial buses 3-i (i=1, 2, . . . , n) are operated under the same protocol is described in the above first to seventh embodiments, the serial buses 3-i may not necessarily be operated under the same protocol. Further, the boot control signal Vi may be a power preparation complete signal of a processor, a data preparation complete signal of a boot bus, a clock signal of a bus, or the like.

When two boot buses are connected with the processors 2-i, 10-k, and 16, the boot bus use permission signal may be: a signal that controls only one of the boot buses, a signal that separately controls two boot buses, or a signal that simultaneously controls two boot buses. Further, while a case where one or two boot buses are connected with the processors 2-i, 10-k, and 16, is described in the above first to seventh embodiments, three or more boot buses may also be connected with the processors 2-i, 10-k, and 16.

While a case where a nonvolatile memory that stores a boot program P is connected only with the processor 2-n through a boot bus is described in the above second to fourth embodiments, the nonvolatile memory that stores the boot program P may be connected with at least one of the processors other than the processor 2-n through boot buses. Further, in the above fifth to seventh embodiments, the nonvolatile memory that stores the boot program P can be connected with at least one of the processors 2-i through boot buses.

While, in the above fifth to seventh embodiments, the instruction codes of a boot program P are provided to a memory controller 4b through buses 11-k. or a system bus 15, the instruction codes and a variety of data and the like of programs (for example, a test program) other than the boot program P can be provided to the memory controller 4b through the buses 11-k. or the system bus 15, simultaneously with the instruction codes of the boot program P, or separately from the instruction codes of the boot program P.

In the above sixth and seventh embodiments, the boot program P may be read from: a nonvolatile memory connected with an LSI 14-1; a nonvolatile memory embedded in the LSI 14-1; a nonvolatile memory connected with either LSI 14-2 or LSI 14-3; or a nonvolatile memory embedded in either LSI 14-2 or LSI 14-3. Likewise, the instruction of writing the boot program P in the memories 4a-j directed to the memory controller 4b may be issued by: a DMA controller embedded in the LSI 14-1; a DMA controller embedded in the chip set 4; or a DMA controller embedded in either the LSI 14-2 or the LSI 14-3.

In the above sixth embodiment, the processor 16 may be a processor core embedded in the LSI 14-1; the memory 17 may be embedded in the LSI 14-1 or the processor 16; and the memory 17 may be connected with the LSI 14-1 instead of the processor 16. Further, in the above sixth embodiment, the data processing device 1e may comprise the LSI 14-1 depicted in FIG. 6, a system bus 15 as a fifth bus, a processor 16, a memory 17, a bus 18, and a boot bus 19. Further, in the above seventh embodiment, a wireless communication path may be provided instead of a wired communication path 22. Further, in the above sixth embodiment, the data processing device 1e may comprise the LSI 14-1, the system bus 15, and the transceiver 20 depicted in FIG. 7.

What is claimed is:

1. A data processing device comprising:
a first number of first processors that initialize the data processing device based on a first or a second boot program for initialization of first buses after power-on, the first number being one or more;
the first buses, connected with the first processors respectively, that require initialization based on the first or the second boot program before use;
a chip set that includes: a second number of first memories that store the first boot program respectively, the second number being one or more and being the first number or less; and a memory controller that reads out the first boot program stored in the first memories;
the first number of second buses, arranged between the memory controller and the first processors to provide the first boot program read out by the memory controller to the first processors, that do not require initialization based on the first boot program before use,
wherein the chip set further includes a boot control unit that performs at least one of: controlling activation timing of the first processors; controlling reboot timing of the first processors; and controlling access to the second buses, and
the data processing device further comprising:
a nonvolatile second memory that stores the second boot program for initialization of the first buses after power-on; and
a third bus, arranged between the second memory and one of the first processors to provide the second boot program stored in the second memory to said first processor, that does not require initialization before use by said first processor based on the second boot program,
wherein the boot control unit selects either one of the first boot program stored in the first memories or the second boot program stored in the second memory so that said first processor executes either one of the first boot program or the second boot program upon activation.

2. A data processing device comprising:
a first number of first processors that initialize the data processing device based on a first or a second boot program for initialization of first buses after power-on, the first number being one or more;
the first buses, connected with the first processors respectively, that require initialization based on the first or the second boot program before use;
a chip set that includes: a second number of first memories that store the first boot program respectively, the second number being one or more and being the first number or less; and a memory controller that reads out the first boot program stored in the first memories;
the first number of second buses, arranged between the memory controller and the first processors to provide the first boot program read out by the memory controller to the first processors, that do not require initialization based on the first boot program before use,
wherein the chip set further includes a boot control unit that performs at least one of: controlling activation timing of the first processors; controlling reboot timing of the first processors; and controlling access to the second buses, and
the data processing device further comprising:
a nonvolatile second memory that stores the second boot program for initialization of the first buses after power-on,
wherein at least one of the second buses includes: a first portion that is arranged between the memory controller and one of the first processors to provide the first boot program read out by the memory controller to said first processor; and a second portion that is arranged between the first portion and said first processor to provide the second boot program stored in the second memory to said first processor, and
the boot control unit selects either one of the first boot program stored in the first memories or the second boot program stored in the second memory so that said first processor executes either one of the first boot program or the second boot program upon activation.

3. A data processing device comprising:
a first number of first processors that initialize the data processing device based on a first or a second boot program for initialization of first buses after power-on, the first number being one or more;
the first buses, connected with the first processors respectively, that require initialization based on the first or the second boot program before use;
a chip set that includes: a second number of first memories that store the first boot program respectively, the second number being one or more and being the first number or less; and a memory controller that reads out the first boot program stored in the first memories;

the first number of second buses, arranged between the memory controller and the first processors to provide the first boot program read out by the memory controller to the first processors, that do not require initialization based on the first boot program before use, wherein the chip set further includes a boot control unit that performs at least one of: controlling activation timing of the first processors; controlling reboot timing of the first processors; and controlling access to the second buses, and the data processing device further comprising:

a nonvolatile second memory that stores the second boot program for initialization of the first buses after power-on; and a third bus, arranged between the second memory and the memory controller to provide the second boot program stored in the second memory to the first processors, that does not require initialization before use by the first processors based on the second boot program, wherein the boot control unit selects either one of the first boot program stored in the first memories or the second boot program stored in the second memory so that the first processors execute either one of the first boot program or the second boot program upon activation.

4. The data processing device according to claim 1, wherein at least one of the first boot program is a program that writes the second boot program in the second memory.

5. A data processing device comprising:

a first number of first processors that initialize the data processing device based on a first boot program for initialization of first buses after power-on, the first number being one or more;

the first buses, connected with the first processors respectively, that require initialization based on the first boot program before use;

a chip set that includes: a second number of first memories that store the first boot program respectively, the second number being one or more and being the first number or less; and a memory controller that reads out the first boot program stored in the first memories; and the first number of second buses, arranged between the memory controller and the first processors to provide the first boot program read out by the memory controller to the first processors, that do not require initialization based on the first boot program before use, wherein the chip set further includes a boot control unit that performs at least one of: controlling activation timing of the first processors; controlling reboot timing of the first processors; and controlling access to the second buses, and wherein the first memories are memories that are rewritable by the memory controller, and the data processing device further comprises:

a third number of second processors, the third number being one or more; and the third number of fourth buses that are arranged between the second processors and the memory controller to provide at least one of the first boot program that the memory controller writes in the first memories from the second processors to the memory controller.

6. The data processing device according to claim 1, wherein the first memories are memories that are rewritable by the memory controller, and the data processing device further comprises:

a third number of second processors, the third number being one or more; and the third number of fourth buses that are arranged between the second processors and the memory controller to provide at least one of the first boot program that the memory controller writes in the first memories from the second processors to the memory controller.

7. A data processing device comprising:

a first number of first processors that initialize the data processing device based on a first boot program for initialization of first buses after power-on, the first number being one or more;

the first buses, connected with the first processors respectively, that require initialization based on the first boot program before use;

a chip set that includes: a second number of first memories that store the first boot program respectively, the second number being one or more and being the first number or less; and a memory controller that reads out the first boot program stored in the first memories; and the first number of second buses, arranged between the memory controller and the first processors to provide the first boot program read out by the memory controller to the first processors, that do not require initialization based on the first boot program before use, wherein the chip set further includes a boot control unit that performs at least one of: controlling activation timing of the first processors; controlling reboot timing of the first processors; and controlling access to the second buses, and wherein the first memories are memories that are rewritable by the memory controller, and the data processing device further comprises:

a fourth number of large scale integrated circuit(s) (LSI(s)), the fourth number being one or more; and a fifth bus that is arranged between the LSI(s) and the memory controller, wherein at least one of the first boot program that the memory controller writes in the first memories is provided from at least one of the LSIs to the memory controller through the fifth bus.

8. The data processing device according to claim 1, wherein the first memories are memories that are rewritable by the memory controller, and the data processing device further comprises:

a fourth number of large scale integrated circuit(s) (LSI(s)), the fourth number being one or more; and a fifth bus that is arranged between the LSI(s) and the memory controller, wherein at least one of the first boot program that the memory controller writes in the first memories is provided from at least one of the LSIs to the memory controller through the fifth bus.

9. The data processing device according to claim 8, further comprising:

a transceiver that communicates in wired communication or wireless communication, wherein the transceiver receives the first boot program transmitted from an external device storing the boot program, and stores the boot program in at least one of the first memories through one of the LSIs, the fifth bus, and the memory controller, the transceiver receives a command transmitted from the external device, and transmits the command to the boot control unit through the LSI and the fifth bus, and
at least one of the first processors executes the first boot program according to the command.

\* \* \* \* \*